(12) United States Patent
Nago

(10) Patent No.: US 8,522,929 B2
(45) Date of Patent: Sep. 3, 2013

(54) BICYCLE RIM BRAKE ASSEMBLY

(75) Inventor: Daisuke Nago, Sakai (JP)

(73) Assignee: Shimano Inc., Osaka (JP)

( * ) Notice: Subject to any disclaimer, the term of this patent is extended or adjusted under 35 U.S.C. 154(b) by 371 days.

(21) Appl. No.: 12/635,342

(22) Filed: Dec. 10, 2009

(65) Prior Publication Data

US 2011/0139552 A1 Jun. 16, 2011

(51) Int. Cl.
*B62L 3/02* (2006.01)

(52) U.S. Cl.
USPC ............. 188/24.22; 188/24.21; 188/2 D

(58) Field of Classification Search
USPC .......... 188/24.22, 24.21, 24.19, 24.11–24.16, 188/2 D, 2 F, 19, 20
See application file for complete search history.

(56) References Cited

U.S. PATENT DOCUMENTS

| | | | | |
|---|---|---|---|---|
| 4,290,506 A | * | 9/1981 | Nagano et al. | 188/24.19 |
| 4,511,018 A | * | 4/1985 | Scott | 188/24.12 |
| 4,553,641 A | * | 11/1985 | Scott et al. | 188/24.22 |
| 4,838,387 A | | 6/1989 | Yoshigai | |
| 5,328,001 A | * | 7/1994 | Yoshikawa | 188/24.22 |
| 5,484,032 A | * | 1/1996 | Li | 188/24.21 |
| 5,819,880 A | | 10/1998 | Ota et al. | |
| 6,412,605 B2 | | 7/2002 | Campagnolo | |
| 2005/0061587 A1 | * | 3/2005 | Tsai | 188/24.14 |
| 2007/0023237 A1 | | 2/2007 | Nago | |

FOREIGN PATENT DOCUMENTS

| | | |
|---|---|---|
| DE | 4328758 A1 | 3/1995 |
| FR | 619795 A | 4/1927 |
| GB | 1038994 A | 8/1966 |
| JP | 4-11193 U | 1/1992 |

* cited by examiner

*Primary Examiner* — Xuan Lan Nguyen
(74) *Attorney, Agent, or Firm* — Global IP Counselors

(57) ABSTRACT

A bicycle rim brake assembly includes a support bracket, first and second brake arms, a fixing member and a biasing member. The first brake arm is pivotally supported to the support bracket. The second brake arm is pivotally supported to the support bracket. The fixing member has a support bracket section and a bicycle frame attachment section. The biasing member is disposed on the fixing member.

18 Claims, 14 Drawing Sheets

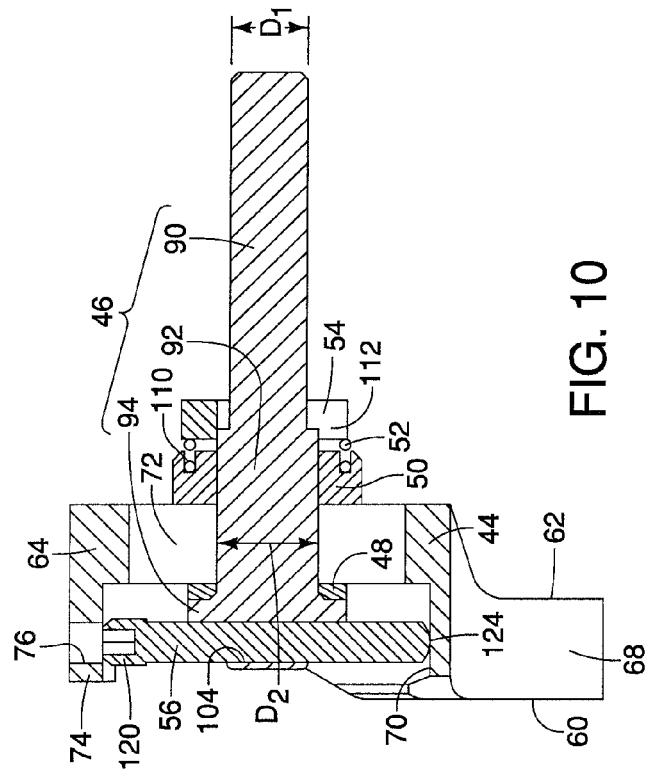
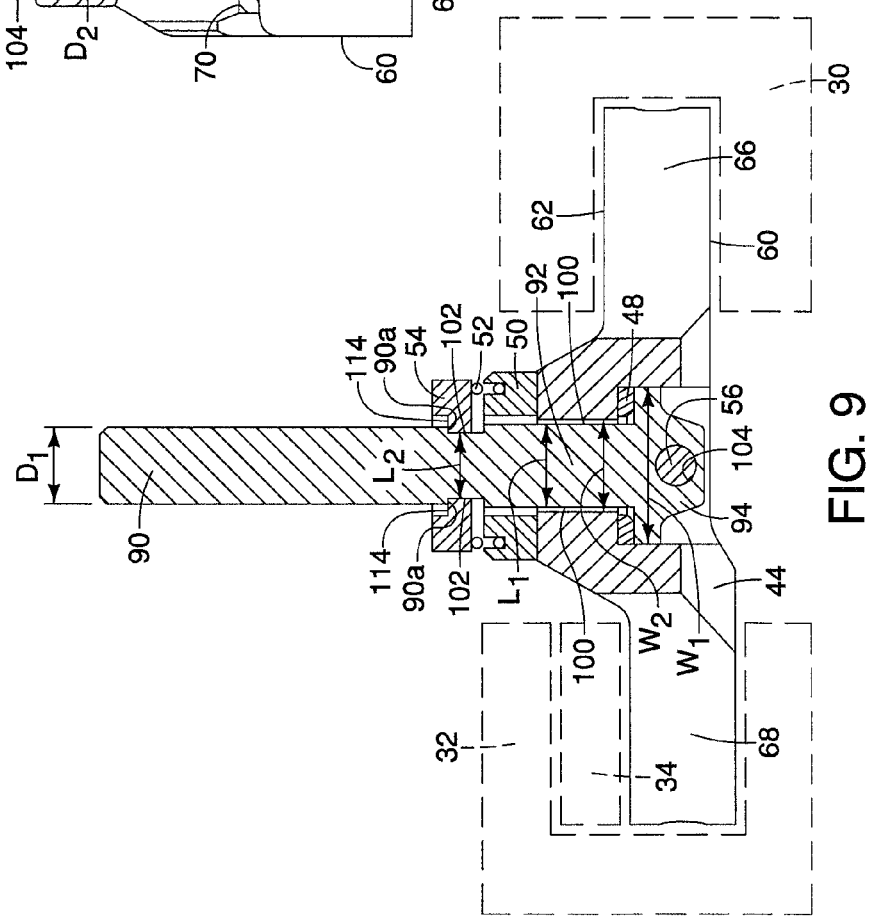
FIG. 10
FIG. 9

BICYCLE RIM BRAKE ASSEMBLY

BACKGROUND

1. Field of the Invention

This invention generally relates to a bicycle rim brake assembly. More specifically, the present invention relates to bicycle rim brake assembly with a position adjusting arrangement that remains in an adjusted position with the bicycle rim brake assembly installed or uninstalled to a bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY

One aspect is to provide a bicycle rim brake assembly with a convenient way of adjusting the position of the rim brake assembly relative to the rim of a bicycle tire.

Another aspect is to provide a bicycle rim brake assembly with a position adjusting arrangement that retains the position adjustment of the rim brake assembly relative to a rim of a bicycle tire when the rim brake assembly is removed and reinstalled to the bicycle frame.

In accordance with one embodiment, a bicycle rim brake assembly includes a support bracket, a first brake arm, a second brake arm, a fixing member and a biasing member. The first brake arm is pivotally supported to the support bracket. The second brake arm is also pivotally supported to the support bracket. The fixing member has a support bracket section and a bicycle frame attachment section. The biasing member is disposed on the fixing member.

BRIEF DESCRIPTION OF THE DRAWINGS

Referring now to the attached drawings which form a part of this original disclosure:

FIG. 9 is a cross-sectional view of the bracket assembly taken along the line 9-9 in FIG. 6, in accordance with the first embodiment of the present invention;

FIG. 10 is a cross-sectional view of the bracket assembly taken along the line 10-10 in FIG. 6, in accordance with the first embodiment of the present invention;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
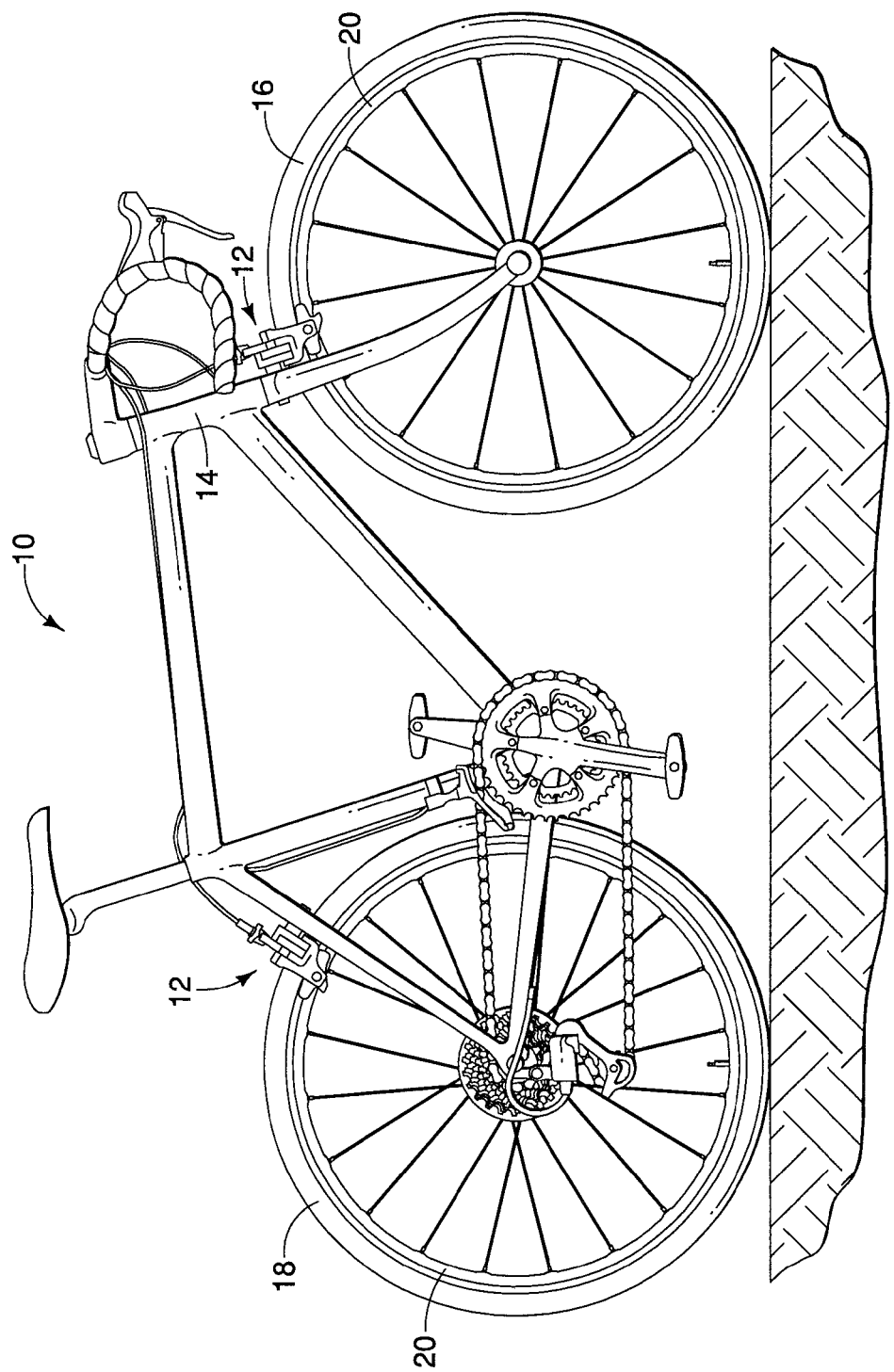
FIG. 1 is a side elevational view of a bicycle that has a bicycle frame, bicycle tires and a bicycle rim brake assembly in accordance with one embodiment of the present invention.

Referring initially to FIG. 1, a bicycle 10 is illustrated with a rim brake assembly 12 in accordance with a first embodiment. As described in greater detail below, the rim brake assembly 12 includes position adjusting arrangement that maintains the relative position between various elements of the rim brake assembly 12, regardless of whether or not the rim brake assembly 12 installed to the bicycle 10 or uninstalled from the bicycle 10.

A brief description of the bicycle 10 is now provided with respect to FIG. 1. The bicycle 10 includes a bicycle frame 14, front and rear wheels 16 and 18 and a pair of the rim brake assemblies 12. The front and rear wheels 16 and 18 each include a metallic rim 20.

As shown in FIG. 1, one of the rim brake assemblies 12 is installed to the bicycle frame 14 adjacent to the front wheel 16 and the other of the rim brake assemblies 12 is installed to the bicycle frame 14 adjacent to the rear wheel 18. The rim brake assemblies 12 are identical. Therefore, description of only one rim brake assembly 12 is provided hereinbelow for the sake of brevity.

Figure 2:
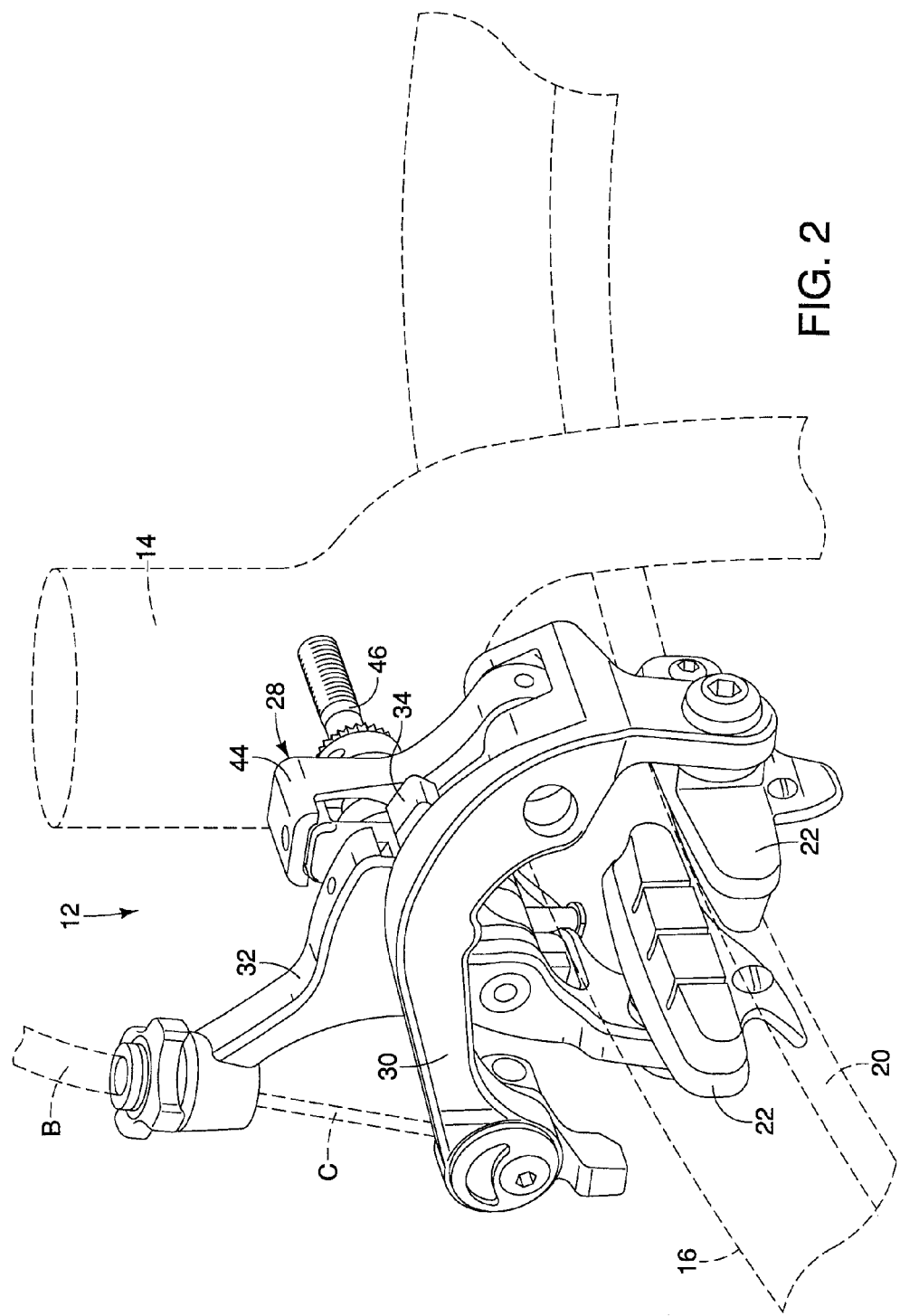
FIG. 2 is a perspective view of the bicycle rim brake assembly with the bicycle frame shown in phantom in accordance with one embodiment of the present invention.

As shown in FIG. 2, the rim brake assembly 12 is installed on the bicycle frame 14 such that the rim brake assembly 12 straddles the front wheel 16. More specifically, the rim brake assembly 12 is positioned such that brake shoes 22 are located proximate opposing sides of the metallic rim 20 of the front wheel 16. When a conventional brake lever on the bicycle frame 14 is moved, a Bowden type cable B transmits movement of the brake lever to the rim brake assembly 12. More specifically, a cable C within the Bowden type cable B causes the brake shoes 22 to be brought into contact with the metallic rim 20 in a conventional manner, producing friction to slow down and/or stop the bicycle 10. As is described in greater detail below, the vertical position of the rim brake assembly 12 is adjustable relative to the bicycle frame 14. Thus, the position of the brake shoes 22 relative to the metallic rim 20 can be adjusted.

Figure 3:
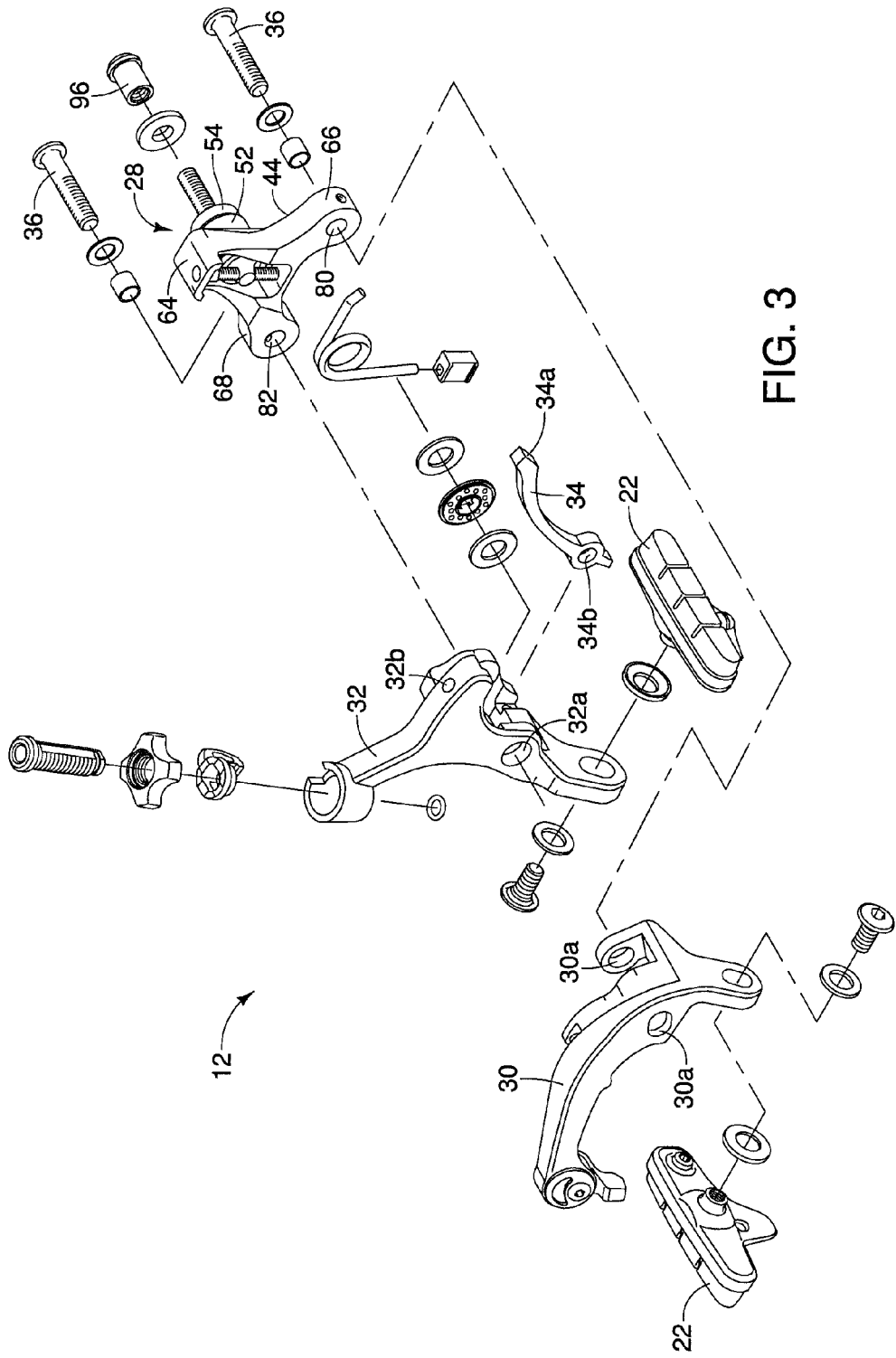
FIG. 3 is an exploded view of the bicycle rim brake assembly showing various elements of the assembly, including a bracket assembly in accordance with a first embodiment of the present invention.

A more detailed description of the rim brake assembly 12 is now provided with specific reference to FIG. 3. The rim brake assembly 12 basically includes a bracket assembly 28, a first brake arm 30, a second brake arm 32, an adjustment arm 34, the brake shoes 22 and pivot pins 36.

Figure 4:
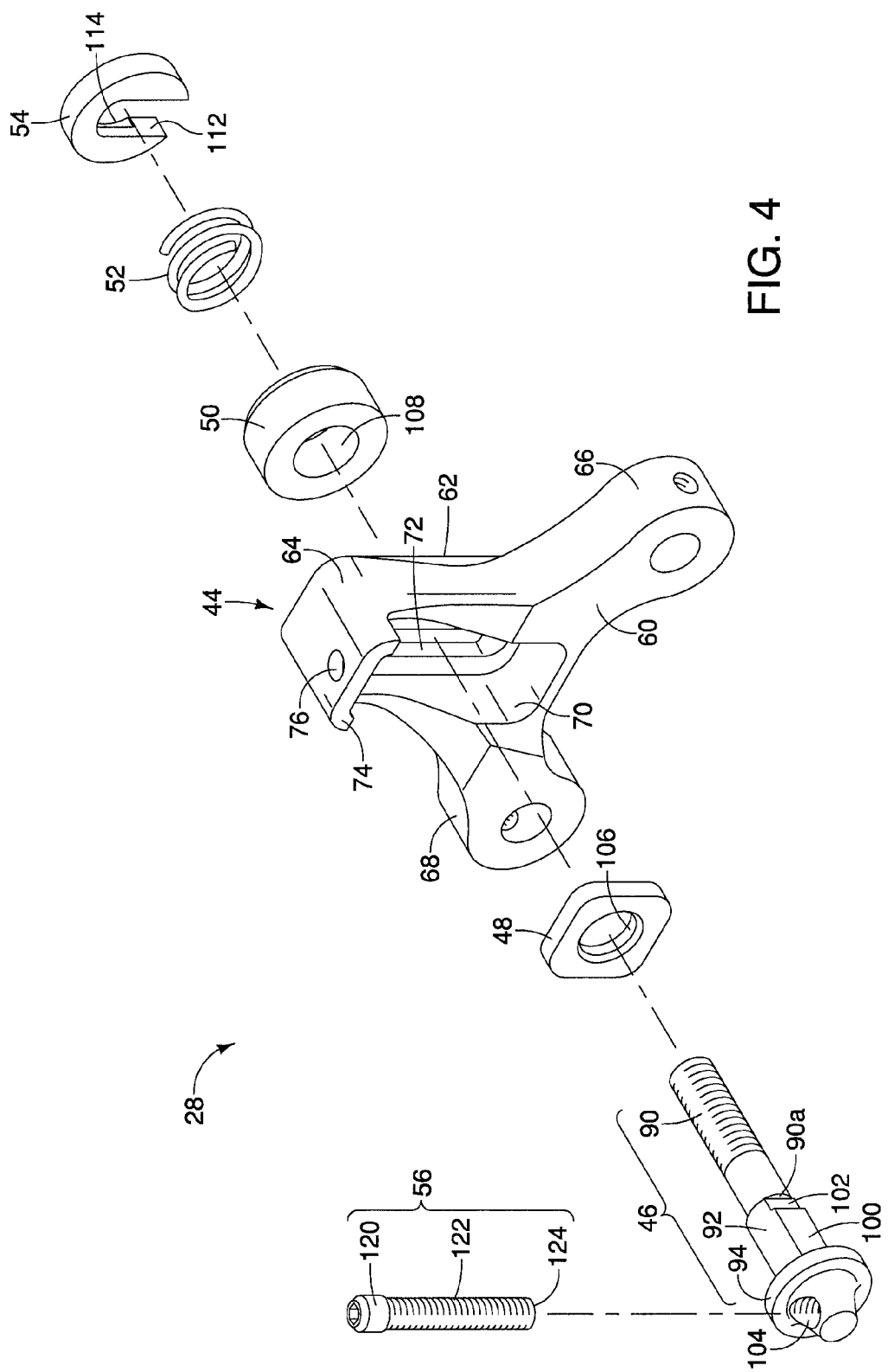
FIG. 4 is an exploded view of the bracket assembly shown removed from the bicycle rim brake assembly, showing a bracket with an elongated adjusting aperture, a fixing element, a flat washer, a rear washer, a biasing member, a C-shaped washer and an adjustable support member in accordance with the first embodiment of the present invention.

As shown in FIG. 4, the bracket assembly 28 includes a bracket 44, a fixing member 46, a flat washer 48, a rear washer 50, a biasing member 52, a C-shaped washer 54 and a locking member 56 (an adjustable support member).

The bracket 44 includes a first side 60, a second side 62 (see FIGS. 9, 10, 13 and 14), a central section 64, a first leg 66 and a second leg 68. The central section 64 has a rectangular shaped recess 70 that is open to the first side 60 of the bracket 44. Within the recess 70, an elongated aperture 72 is formed in the central section 64 of the bracket 44. More specifically, the elongated aperture 72 extends from the recess 70 to the second side 62 of the bracket 44. An upper end of the central section 64 of the bracket 44 includes a flange 74. The flange 74 includes has a hole 76 that extends completely through the flange 74. The purpose of the hole 76 is explained below.

Figure 5:
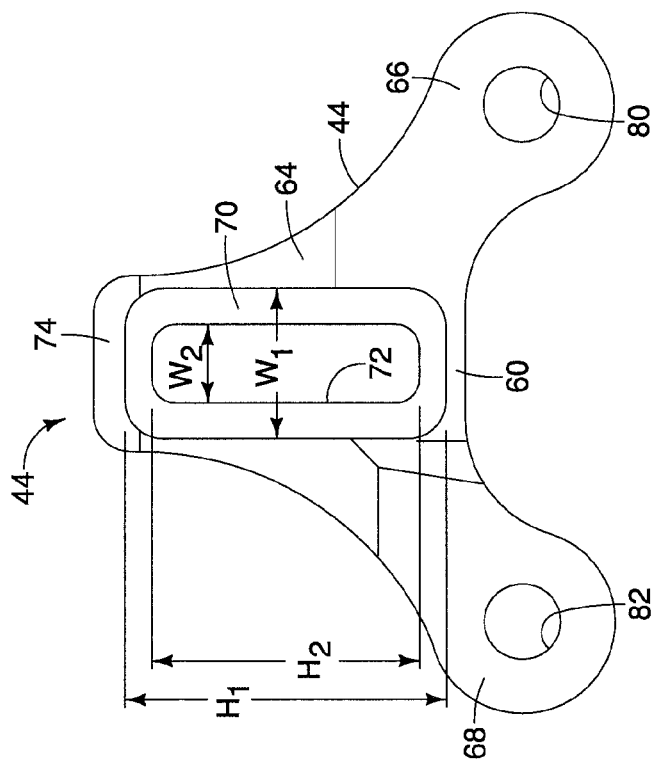
FIG. 5 is a front view of the bracket shown removed from the bracket assembly and the bicycle rim brake assembly for clarity, showing the elongated aperture, in accordance with the first embodiment of the present invention.

As best shown in FIG. 5, the recess 70 has a height $H_1$ and a width $W_1$. The elongated aperture 72 has a height $H_2$ and a width $W_2$.

With reference again to FIG. 4, the first leg 66 extends away from the central section 64 and the second leg 68 extends away from the central section 64. Further, the first leg 66 and the second leg 68 extend away from one another. The first leg 66 includes an aperture 80 and the second leg includes an aperture 82. The apertures 80 and 82 are preferably parallel to one another. Further, the apertures 80 and 82 are spaced apart from one another and also spaced apart from the elongated aperture 72.

As best shown in FIGS. 4, 9, 10, 13 and 14, the fixing member 46 is basically a shaft or axle that includes a threaded shaft section 90, a rotation restricting section 92, and a head section 94. The threaded shaft section 90 includes machine threads that are dimensioned to mate with internal threads of a nut 96 (shown in FIG. 3). The threaded shaft section 90 is a bicycle frame attachment portion dimensioned for attachment to the bicycle frame 14, as described in greater detail below.

The rotation restricting section 92 includes a pair of first flat surfaces 100 (see FIGS. 4, 9, 13 and 14) and a pair of second flat surfaces 102 (see FIGS. 4, 9, 13 and 14). In the axial direction of the fixing member 46, the pair of first flat surfaces 100 are longer than the pair of second flat surfaces 102.

As is best shown in FIGS. 9 and 10, the threaded shaft section 90 has an outer diameter $D_1$ (FIG. 9). The rotation restricting section 92 has an overall diameter $D_2$ (FIG. 10). The first flat surfaces 100 are parallel to one another. The first flat surfaces 100 are spaced apart from one another by a distance $L_1$ (FIG. 9) and the second flat surfaces 102 are spaced apart from one another by a distance $L_2$ (FIG. 9). The distance $L_1$ between the first flat surfaces 100 is less than the diameter $D_2$ and is greater than or equal to the outer diameter $D_1$ of the threaded shaft section 90. The distance $L_1$ between the first flat surfaces 100 is also greater than the distance $L_2$ between the second flat surfaces 102.

Further, the distance $L_1$ between the pair of first flat surfaces 100 of the rotation restricting section 92 is preferably slightly less than the width $W_2$ of the elongated aperture 72. More specifically, the rotation restricting section 92 is dimensioned such that with the fixing member 46 installed in the elongated aperture 72, the rotation restricting section 92 allows the fixing member 46 to moved up and down the elongated aperture 72 of the bracket 44, but prevents the fixing member 46 from rotating within the elongated aperture 72.

Figure 14:
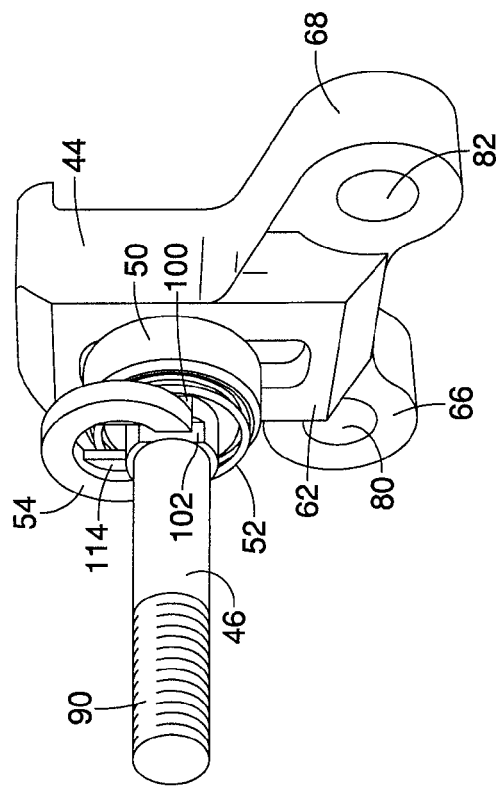
FIG. 14 is another perspective view of the bracket assembly, similar to FIG. 13, showing the biasing member at least partially compressed during installation of the C-shaped washer, in accordance with the first embodiment of the present invention.

The distance $L_2$ between the pair of second flat surfaces 102 is dimensioned to receive the C-shaped washer 54, as is described in greater detail below. A pair of surfaces 90a (only one is visible in FIG. 4) is formed between the second flat surfaces 102 and the threaded shaft section 90. Each surface 90a extends in a direction perpendicular to the axial length or axial direction of the fixing member 46, as indicated in FIGS. 4, 9 and 14.

The head section 94 of the fixing member 46 has an overall diameter that is larger than the diameter $D_1$ of the threaded shaft section 90 and diameter $D_2$ of the rotation restricting section 92. Further, the head section 94 of the fixing member 46 has an overall diameter that is larger than the width $W_2$ of the elongated aperture 72, but is slightly smaller than the width $W_1$ of the rectangular shaped recess 70 of the central section 64 of the bracket 44. Hence, the threaded shaft section 90 and the rotation restricting section 92 can extend into and through the elongated aperture 72, but the head section 94 cannot.

The head section 94 includes a threaded aperture 104 whose function is described below. The threaded aperture 104 extends in a direction that is perpendicular to the axial length of the fixing member 46.

Figure 6:
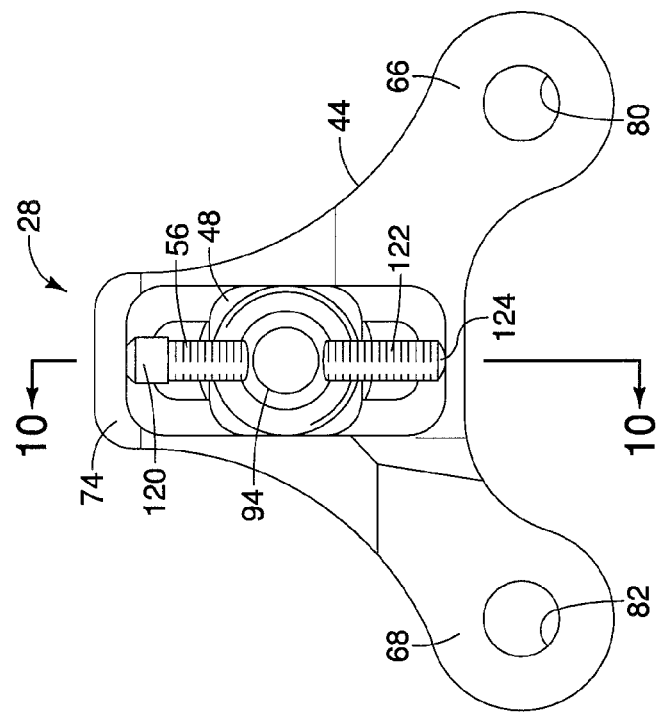
FIG. 6 is a front view of the bracket assembly with other portions of the bicycle rim brake assembly removed for clarity, showing the bracket and the fixing member adjusted relative to one another with the fixing member in a central location within the elongated adjusting aperture, in accordance with the first embodiment of the present invention.
Figure 8:
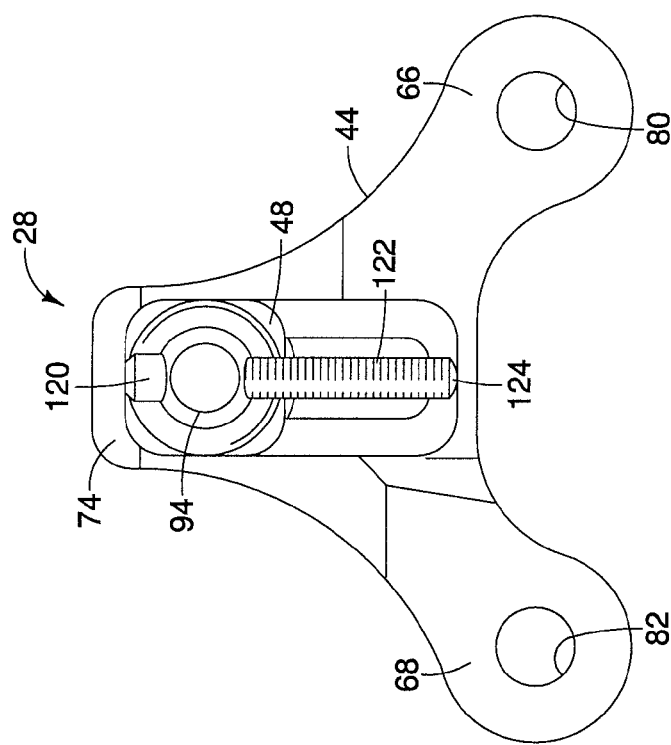
FIG. 8 is another front view of the bracket assembly similar to FIG. 6 showing the bracket and the fixing member adjusted relative to one another with the fixing member in an upper location within the elongated adjusting aperture lowing the bracket (and the bicycle rim brake assembly) to a lowermost position, in accordance with the first embodiment of the present invention.
Figure 7:
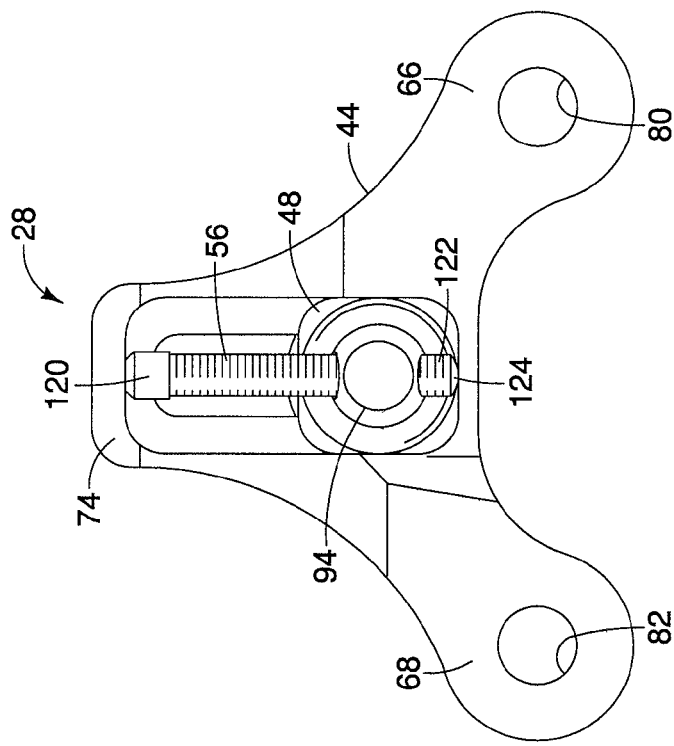
FIG. 7 is another front view of the bracket assembly similar to FIG. 6 showing the bracket and the fixing member adjusted relative to one another with the fixing member in a lower location within the elongated adjusting aperture raising the bracket (and the bicycle rim brake assembly) to an uppermost position, in accordance with the first embodiment of the present invention.

As indicated in FIG. 4, the flat washer 48 has an overall square shape (with rounded corners) and also has a central aperture 106. The central aperture 106 is dimensioned to receive the rotation restricting section 92 of the fixing member 46. Therefore, the central aperture 106 has a diameter that is slightly larger than the diameter $D_2$ of the rotation restricting section 92. The flat washer 48 has a width that is slightly less than the width $W_2$ of the recess 70. Specifically, the flat washer 48 is dimensioned to fit within the recess 70. The flat washer 48 is further dimensioned such that the flat washer 48 can easily slide up and down within the recess 70, as indicated in FIGS. 6, 7 and 8.

Figure 12:
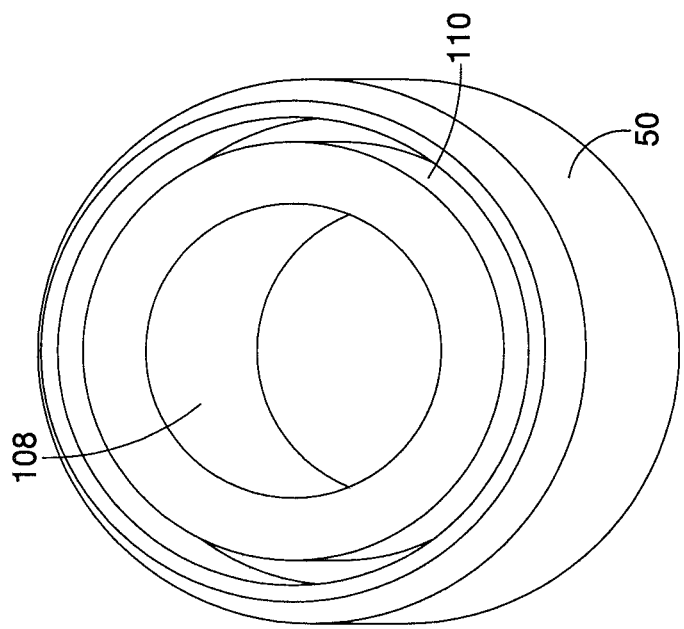
FIG. 12 is an elevational view of the rear washer depicted in FIG. 4, showing a recess dimensioned to receive a portion of the biasing member, in accordance with the first embodiment of the present invention.

As shown in FIGS. 4 and 12, the rear washer 50 is an annular shaped spacer with a central aperture 108 and a recess 110 formed on one side, as shown in FIG. 12. The rear washer 50 is also a support flange (or movable washer) in that it can move in response to biasing forces applied to it by the biasing member 52, as is explained in greater detail below. The central aperture 108 is dimensioned to receive the threaded shaft section 90 of the fixing member 46. Therefore, the central aperture 108 has a diameter that is slightly larger than the diameter $D_1$ of the threaded shaft section 90 of the fixing member 46. The recess 110 is dimensioned to receive a portion of the biasing member 52.

As shown in FIG. 4, the biasing member 52 is preferably a coil spring that is at least partially disposed in the recess 110 of the rear washer 50.

Figure 11:
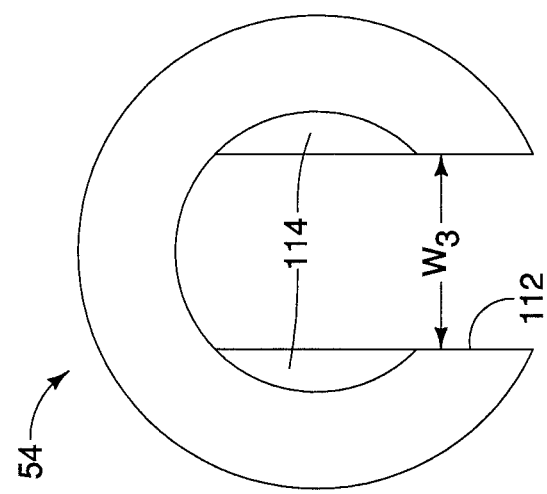
FIG. 11 is a rear elevational view of the C-shaped washer depicted in FIG. 4, in accordance with the first embodiment of the present invention.

As shown in FIGS. 4, 11 and 14, the C-shaped washer 54 has an overall annular-like shape with a gap or slot 112 formed therein. The C-shaped washer 54 is a flange portion or a fixing washer because it retains one end of the biasing member 52 in place relative to the fixing member 46, as is explained in greater detail below.

The C-shaped washer 54 also has a pair of recesses 114. From side to side, the slot 112 has a width $W_3$. The width $W_3$ is approximately equal to or just slightly larger than the distance $L_2$ between the second flat surfaces 102 of the fixing member 46. More specifically, the slot 112 is dimensioned such that the C-shaped washer 54 can be snuggly installed on the second flat surfaces 102 of the rotation restricting section 92 of the fixing member 46.

The recesses 114 are dimensioned such that the recesses 114 engage the surfaces 90a of the fixing member 46.

A description of the locking member 56 is now provided with specific reference to FIGS. 4, 6-8, 10, 15 and 16. The locking member 56 includes a head 120, a threaded portion 122 and a bottom end 124. The head 120 includes a tool receiving aperture 128 that is dimensioned to receive a tool (not shown), such as a screw driver or a Hex-wrench. With the fixing member 56 installed to the bracket 44, the head 120 aligns with the hole 76 of the flange 74 of the bracket 44 (see FIG. 10).

The threaded portion 122 is dimensioned to threadedly fit into the threaded aperture 104 of the fixing member 46. As indicated in FIGS. 6, 7 and 8, as the locking member 56 rotates within the threaded aperture 104, the head 120 and the bottom end 124 move relative to the head section 94 of the fixing member 46.

Hence, when a tool (not shown) is fitted through the hole 76 of the flange 74 of the bracket 44 and into the tool receiving aperture 128 of the head 120 of the locking member 56, the locking member 56 can be rotated to move the bracket 44 up and down relative to the fixing member 46, as indicated in FIGS. 6, 7 and 8.

With reference to again to FIG. 3, the first brake arm 30 is supported on the bracket 44 of the bracket assembly 28 by one of the pivot pins 36. Specifically, the first brake arm 30 is fitted to the first leg 66 and one of the pivot pins 36 is inserted through the apertures 30a and the aperture 80. Thus, the first brake arm 30 is pivotally supported to the bracket 44.

The second brake arm 32 is supported on the bracket 44 of the bracket assembly 28 by the other of the pivot pins 36. Specifically, the second brake arm 32 and the adjustment arm 34 are fitted to the second leg 68 and the other of the pivot pins 36 is inserted through the apertures 32a, the aperture 34b and the aperture 82. Thus, the second brake arm 32 is pivotally supported to the bracket 44. Further, the first brake arm 30 and the second brake arm 32 pivot about axis that are separated from one another and separated from the elongated aperture 72 and the fixing member 46.

The adjustment arm 34 is dimensioned such that a distal end 34a of the adjustment arm 34 acts as a spacer between the first brake arm 30 and the second brake arm 32. Further, a positioning adjustment screw 32b of the second brake arm 32 is dimensioned to contact the distal end 34a of the adjustment arm 34 to provide spacing adjustment.

The rim brake assembly 12 is assembled as follows. First, the bracket assembly 12 is assembled. The locking member 56 is threaded into the aperture 104 of the head section 94 of the fixing member 46. Before or after installing the locking member 56 in the aperture 104, the threaded shaft section 90 and the rotation restricting section 92 are inserted into the flat washer 48. Then the fixing member 46 and the flat washer 48 are fitted to the bracket 44 such that the rotation restricting section 92 is located within the elongated aperture 72 and the threaded shaft section 90 extends away from the bracket 44.

It should be understood from FIGS. 6, 7 and 8 that the locking member 56 is dimensioned to fit within the recess 70 of the bracket 44. Specifically, the locking member 56 is dimensioned to have an overall length that is equal to or slightly less than the height $H_1$ of the recess 70. Further, with the head section 94 of the fixing member 46 and the flat washer 46 installed within the recess 70 of the bracket 44, the locking member 56 aligns with the hole 76. As shown in FIG. 10, the hole 76 has a diameter that is slightly smaller than the head 120 of the locking member 56. Hence, as the locking member 56 is rotated, the locking member 56 is not able to move in a direction corresponding to its axial length. Rather, as the locking member 56 is rotated, the head 120 contacts the flange 74 about the hole 76 and the bottom end 124 contacts the bottom of the recess 70. Hence, the locking member 56 is restricted against movement in an axial direction of the locking member 56.

Instead, as the locking member 56 is rotated by the cyclist or a mechanic, bracket 44 and the rim brake assembly 12 move up and/or down relative to the fixing member 46, as indicated in FIGS. 6, 7 and 8.

Figure 13:
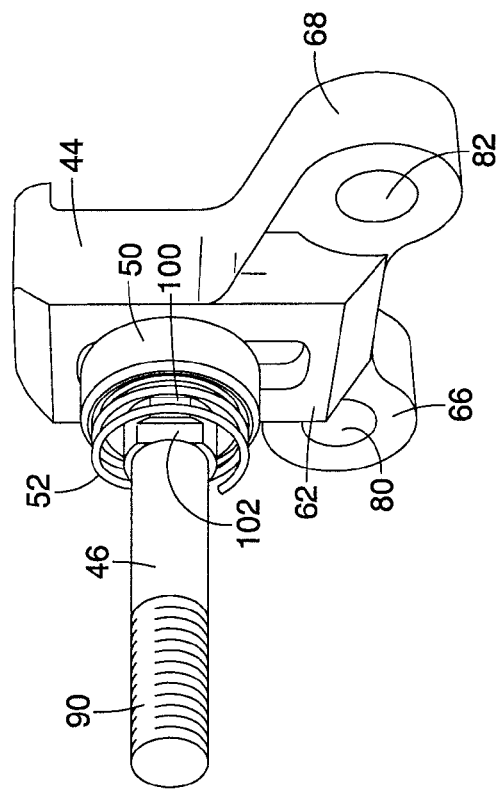
FIG. 13 is a perspective view of the bracket assembly, shown partially assembled showing the rear washer installed on the fixing element and the biasing member extending into the recess of the rear washer, in accordance with the first embodiment of the present invention.

Next, the rear washer 50 and the biasing member 52 are installed, as indicated in FIG. 13. The biasing member 52 is compressed while the C-shaped washer 54 is installed to the second flat surfaces 102 of the fixing member 46, as indicated in FIG. 14. Once the C-shaped washer 54 is installed to the fixing member 46, the surfaces of the recesses 114 of the C-shaped washer 54 contact the surfaces 90a of the fixing member 46, as indicated in FIG. 9.

Finally the first brake arm 30, the second brake arm 32 and the adjustment arm 34 are installed to the bracket 44.

Figure 16:
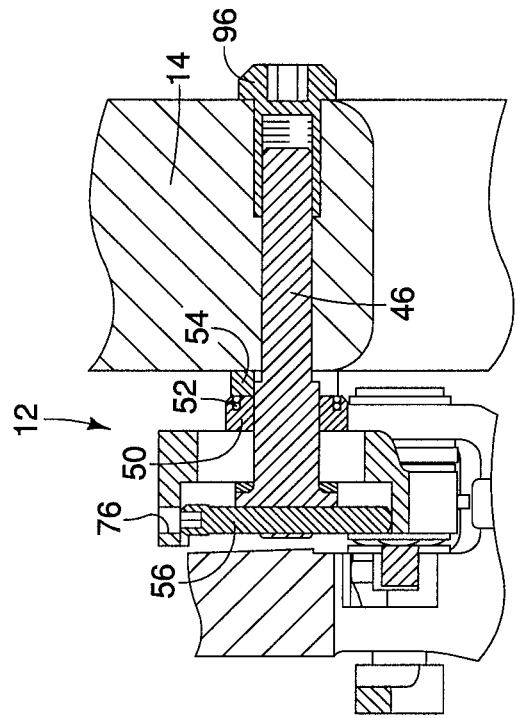
FIG. 16 is a side cross-sectional view of a portion of the bicycle frame and the bicycle rim brake assembly similar to FIG. 15, showing the bicycle rim brake assembly installed to the bicycle frame in accordance with the first embodiment of the present invention.
Figure 15:
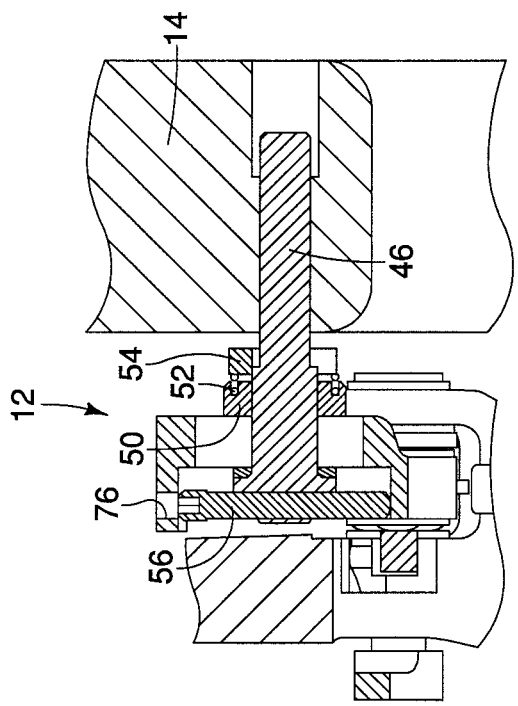
FIG. 15 is a side cross-sectional view of a portion of the bicycle frame and the bicycle rim brake assembly, showing the bicycle rim brake assembly partially removed from the bicycle frame in accordance with the first embodiment of the present invention.

The rim brake assembly 12 is installed to the bicycle frame 14 by inserting the threaded shaft section 90 of the fixing member 46 into an aperture of the bicycle frame 14, as indicated in FIG. 15. Next, the nut 96 is threaded onto the threaded shaft section 90 of the fixing member 46 and tightened, as shown in FIG. 16.

The position adjusting arrangement of the rim brake assembly 12 has two separate parts that can be used together or separately. Further, both of these separate parts of the position adjusting arrangement can be used when the rim brake assembly 12 is installed to the bicycle frame 14 or removed from the bicycle frame 14.

The two separate parts of the position adjusting arrangement of the rim brake assembly 12 are: 1) the biasing member 52; and 2) the movement of the locking member 56.

Figure 17:
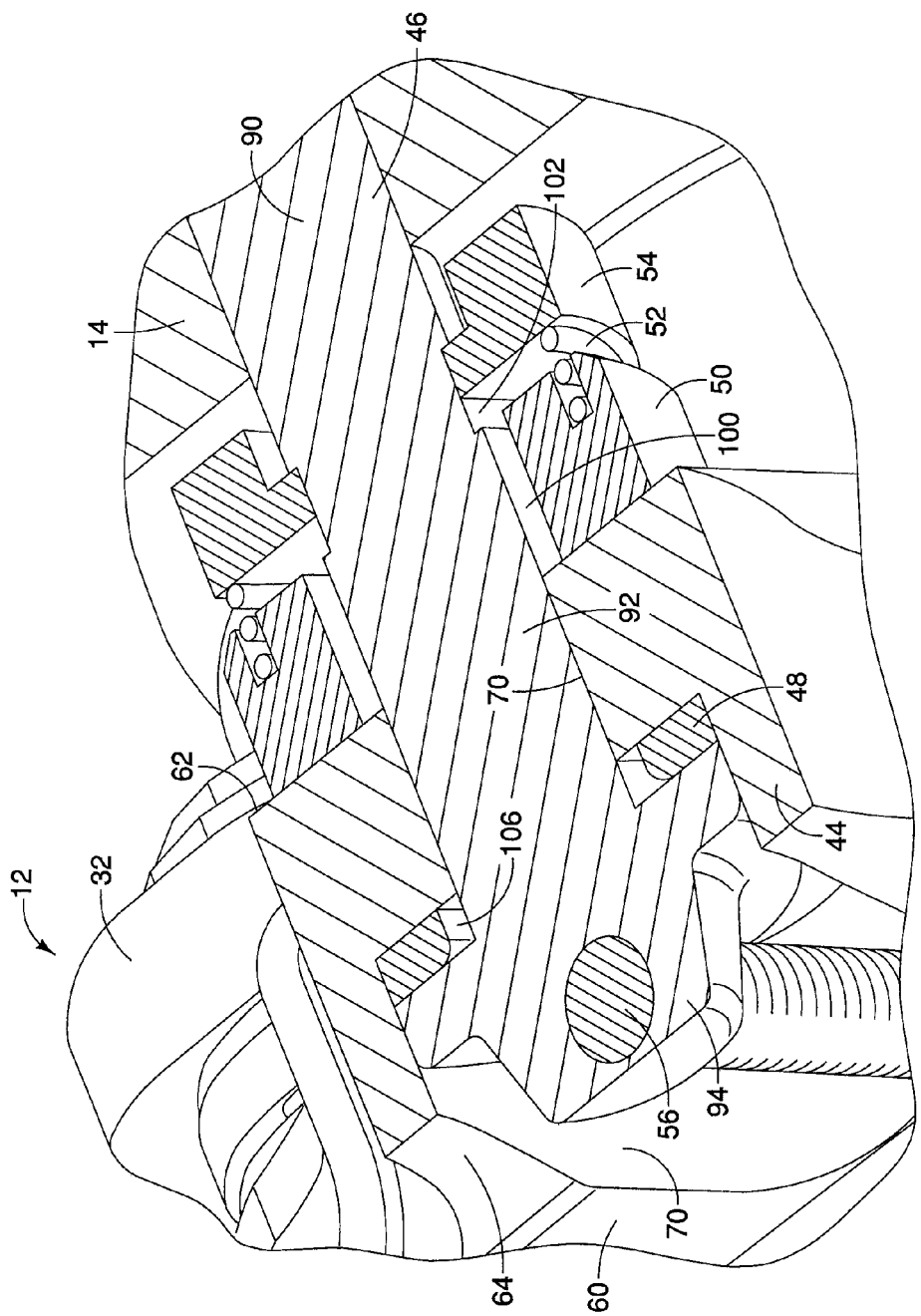
FIG. 17 is a perspective cross-sectional view of a portion of the bicycle frame and the bicycle rim brake assembly, showing the fixing member of the bracket assembly partially installed to the bicycle frame with the rear washer and the C-shaped washer at least partially compressing the biasing member in accordance with the first embodiment of the present invention.

The biasing member 52 applies a biasing force on the head 120, as indicated in FIG. 17. More specifically, the C-shaped washer 54 is attached to the fixing member 46. The biasing member 52 is confined between the C-shaped washer 54 and the bracket 44, with the rear washer 50 disposed between the biasing spring 52 and the bracket 44. The biasing member 52 presses against the C-shaped washer 54 on one side. The biasing member 52 presses against rear washer 50 and the bracket 44 on the other side. The biasing force acting between the bracket 44 and fixing member 46 causes the head 120 of the fixing member 46 to press against the flat washer 48 and the bracket 44. Hence, the bracket 44 is clamped between the head 120 of the fixing member 46 and the biasing member 52. The biasing force of the biasing member 52 retains the bracket 44 and the remaining elements of the rim brake assembly 12 in position relative to the fixing member 56. For example, the force of the biasing member 52 is sufficient to retain the rim brake assembly 12 in position relative to the fixing member 56 in any of the positions depicted in FIGS. 6, 7 and 8, as well as any position in between.

Further, the biasing member 52 can be used in the rim brake assembly 12 in the absence of the locking member 56. In other words, the locking member 56 can be omitted from the rim brake assembly 12. Without the locking member 56, the rim brake assembly 12 can retain its position relative to the fixing member 46 as a result of the biasing force of the biasing member 52.

When the nut 96 is loosened, or when the rim brake assembly 12 is removed from the bicycle frame 14, the biasing force of the biasing member 52 is sufficient to retain the rim brake assembly 12 in its position relative to the fixing member 46. When the nut 96 is tightened, the biasing member 52 is compressed into the recess 110 of the rear washer 50 and the force of the tightened nut 96 retains the rim brake assembly 12 in position relative to the fixing member 46.

The locking member 56 can also be used alone (without the biasing member 52) to adjust and retain the rim brake assembly 12 in its position relative to the fixing member 46. When the nut 96 is loosened, or when the rim brake assembly 12 is removed from the bicycle frame 14, the threaded portion 122 in engagement with the threads of the threaded aperture 104 of the head section 94 of the fixing member 46 retains the rim brake assembly 12 in position relative to the fixing member 46.

The position of the rim brake assembly 12 relative to one of the wheels 16 or 18, can be made by loosening the nut 96, then rotating the locking member 56. The bracket 44 and other elements of the rim brake assembly 12 all move up or down relative to the fixing member 46 when the locking member 56 is rotated.

The biasing member 52 and the locking member 56 can be used together as well. The biasing force of the biasing member 52 and the locking member 56 work together to retain the rim brake assembly 12 in position relative to the fixing member 46 when the rim brake assembly 12 is removed from the bicycle frame 14.

Second Embodiment

Figure 18:
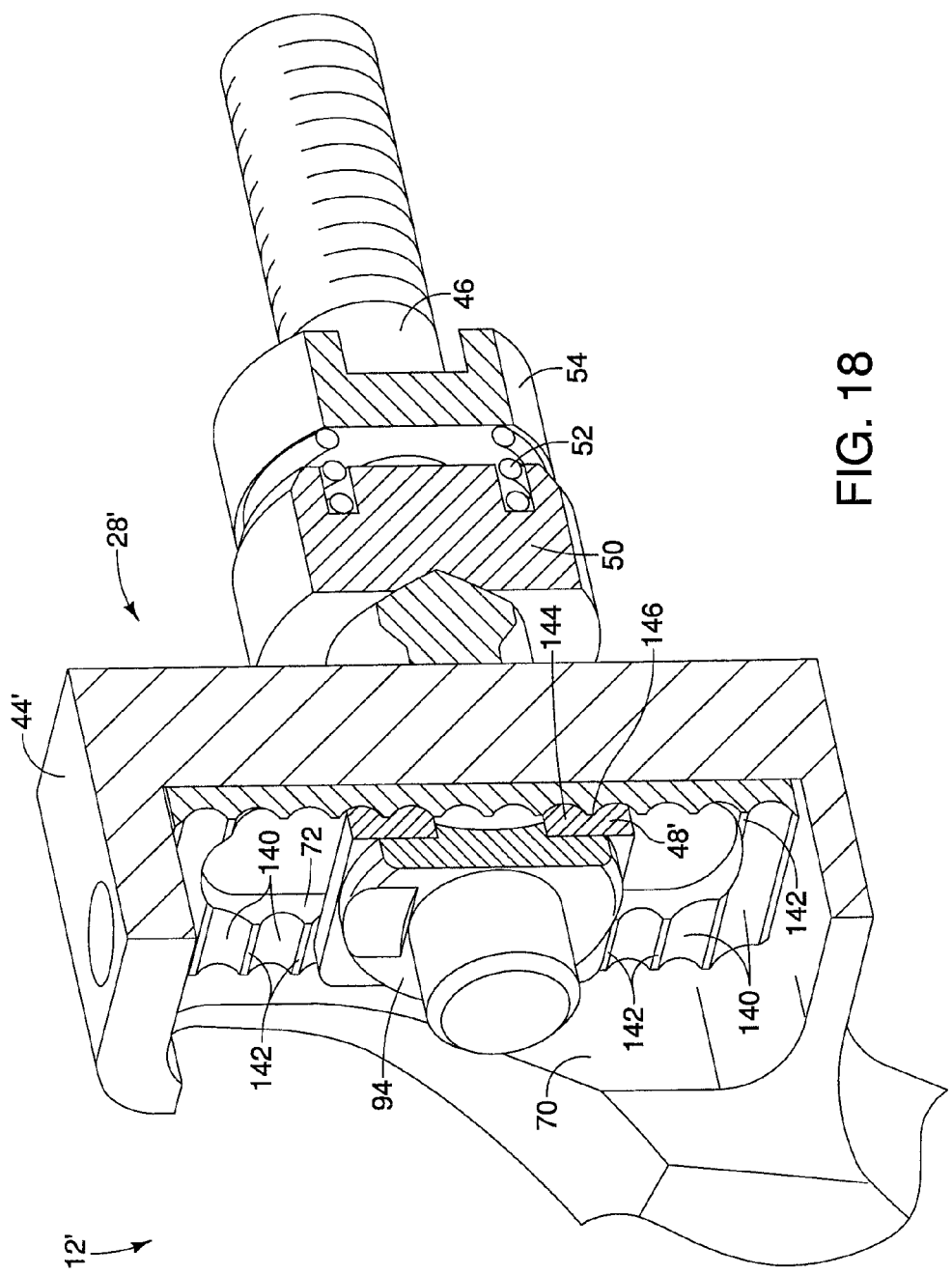
FIG. 18 is a perspective cross-sectional view of a bracket assembly of a bicycle rim brake assembly in accordance with a second embodiment of the present invention.

Referring now to FIG. 18, a rim brake assembly 12' with a bracket assembly 28' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the bracket assembly 28 of the rim brake assembly 12 of the first embodiment is replaced with a bracket assembly 28'. Otherwise, all elements and features of the rim brake assembly 12' are identical to the rim brake assembly 12 of the first embodiment. Therefore, description of other elements and features of the rim brake assembly 12' is omitted for the sake of brevity and to avoid duplication of description.

In the bracket assembly 28', the bracket 44 and the flat washer 48 of the first embodiment are replaced with a bracket 44' and a washer 48'. Further, the locking member 56, the threaded aperture 104 in the head section 94 of the fixing member 46 have been omitted. Otherwise, all other elements of the bracket assembly 28' are identical to the elements of the bracket assembly 28 of the first embodiment. Therefore, description of other elements and features of the bracket assembly 28' is omitted for the sake of brevity and to avoid duplication of description.

The bracket 44' is identical to the bracket 44 of the first embodiment, with one exception. Specifically, the bracket 44' includes the recess 70 and the elongated aperture 72, but also includes a contoured surface surrounding the elongated aperture 72 within the recess 70. Specifically, the surface surrounding the elongated aperture 72 within the recess 70 includes a plurality of straight concaved portions 140 with straight ridges 142 between adjacent concaved portions 140. Similarly, the washer 48' includes convex portions 144 and concaved portions 146.

The convex portions 144 and concaved portions 146 of the bracket 44'. complement and mate with the concaved portions 140 with straight ridges 142 of the bracket 44'. In the second embodiment, the interaction between the respective contoured surfaces of the bracket 44' and the bracket 44' combined with the biasing force of the member 52 retain the rim brake assembly 12 in position relative to the fixing member 46 when the rim brake assembly 12 is removed from the bicycle frame 14.

Third Embodiment

Referring now to FIG. 19-22, a rim brake assembly 12" with a bracket assembly 228 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the bracket assembly 28 of the rim brake assembly 12 of the first embodiment is replaced with a bracket assembly 228. Otherwise, all elements and features of the rim brake assembly 12" are identical to the rim brake assembly 12 of the first embodiment. Therefore, description of other elements and features of the rim brake assembly 12" is omitted for the sake of brevity and to avoid duplication of description.

Figure 20:
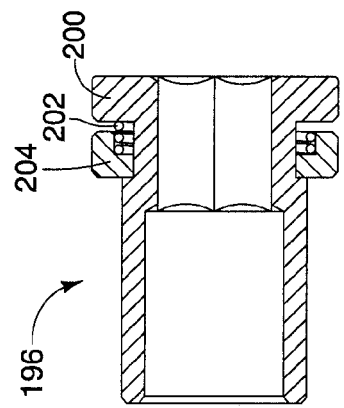
FIG. 20 is a side cross-sectional view of the fixing nut assembly of the bicycle rim brake assembly in accordance with the third embodiment of the present invention.
Figure 19:
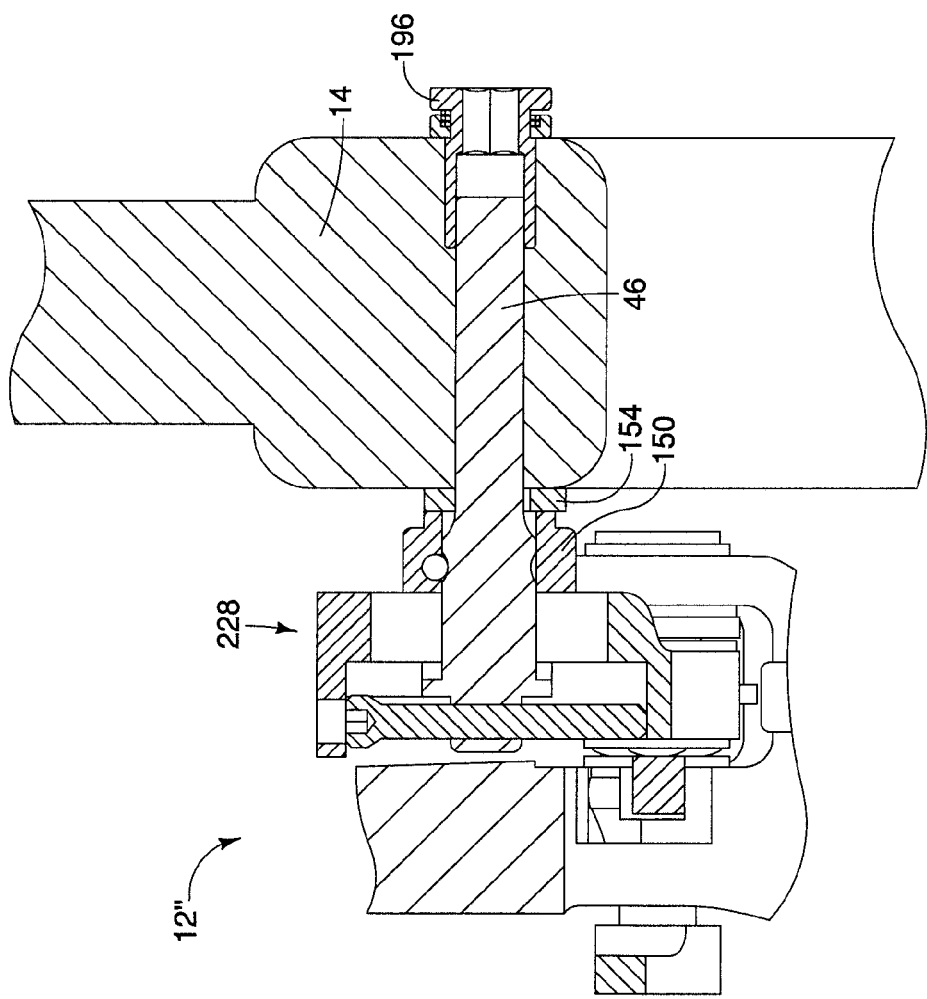
FIG. 19 is a side cross-sectional view of a bicycle rim brake assembly that includes a fixing nut assembly in accordance with a third embodiment of the present invention.
Figure 22:
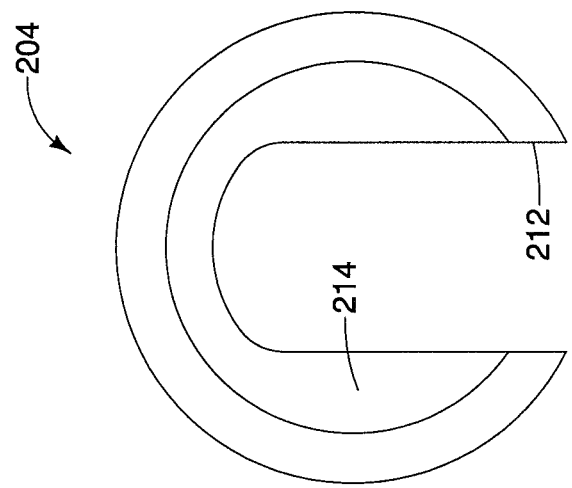
FIG. 22 is a plan elevational view of a C-shaped washer of the fixing nut assembly of the bicycle rim brake assembly in accordance with the third embodiment of the present invention.
Figure 21:
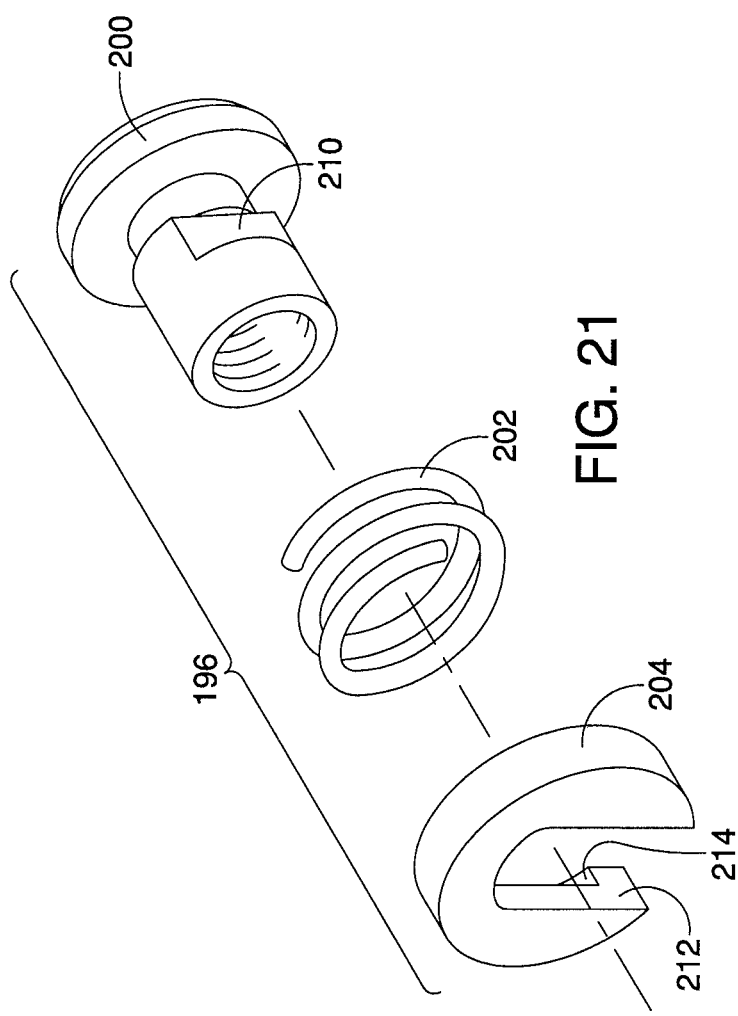
FIG. 21 is an exploded view of the fixing nut assembly of the bicycle rim brake assembly in accordance with the third embodiment of the present invention.

In the bracket assembly 228, the rear washer 50, the biasing member 52 and the C-shaped washer 54 are omitted. In their place, washers 150 and 154 are used, as shown in FIG. 19. The washers 150 and 154 are annular shaped spacer members fitted to the fixing member 46 between the bracket assembly 228 and the bicycle frame 14. Also, in the third embodiment, the nut 96 of the first embodiment has been replace with a nut assembly 196, as shown in FIGS. 19, 20 and 21. All other features and elements of the bracket assembly 228 and the rim brake assembly 12" are otherwise identical to the features and elements of the bracket assembly 28 and the rim brake assembly 12 of the first embodiment.

As best shown in FIGS. 20 and 21, the nut assembly 196 includes a nut 200, a biasing member 202 and a C-shaped washer 204. The nut includes a pair of flat surfaces 210 that are dimensioned to receive the C-shaped washer 204. The C-shaped washer 204 includes a slot 212 a semicircular recess 214, as shown best shown in FIG. 22. The recess 214 is dimensioned to receive the biasing member 202. The slot 212 is dimensioned to engage the pair of flat surfaces 210 of the nut 200. The engagement between the slot 212 and the pair of flat surfaces 210 of the nut 200 retain the C-shaped washer 204 on the nut 204 in a manner similar to the C-shaped washer 54 of the first embodiment.

The biasing member 202 is therefore confined between a large head on the nut and the C-shaped washer 204.

When the nut assembly 196 is tightened on the fixing member 46 to secure the rim brake assembly 12 on the bicycle frame 212, the biasing member 202 is compressed and the force of the tightened nut assembly 196 holds the rim brake assembly 12" in position relative to the fixing member 46.

When the nut assembly 196 is loosened slightly relative to the fixing member 46, the biasing member 202 is still compressed to the extent that the biasing member 202 applies a biasing force to the fixing member 46 in a manner to the biasing member 52 of the first embodiment. Hence, the biasing force of the biasing member 202 holds the rim brake assembly 12" in position relative to the fixing member 46, but allows vertical position adjustment of the rim brake assembly 12" relative to the fixing member 46.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the rim brake assembly. Accordingly, these terms, as utilized to describe the rim brake assembly should be interpreted relative to a bicycle equipped with the rim brake assembly as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim brake assembly comprising:
    a support bracket having a frame facing side and a brake arm facing side;
    a first brake arm pivotally supported to the support bracket along the brake arm facing side;
    a second brake arm pivotally supported to the support bracket along the brake arm facing side;
    a fixing member having a support bracket section and a bicycle frame attachment section; and
    a biasing member disposed on the fixing member at the frame facing side of the support bracket, the biasing member being configured to provide a biasing force in a direction parallel to an axial direction of the fixing member and perpendicular to the frame facing side of the support bracket.

2. The bicycle rim brake assembly according to claim 1, wherein
    the support bracket has an elongated adjusting aperture.

3. The bicycle rim brake assembly according to claim 2, wherein
    the support bracket section of the fixing member extends through the elongated adjusting aperture, the support bracket being adjustably coupled to the fixing member for movement between a plurality of adjustment positions along the elongated adjusting aperture.

4. The bicycle rim brake assembly according to claim wherein
    the biasing member is disposed on the support bracket section of the fixing member.

5. The bicycle rim brake assembly according to claim 4, wherein
    the biasing member comprises a flange portion, a support flange disposed between the flange portion and the support bracket, and a biasing spring disposed between the flange portion and the support flange.

6. The bicycle rim brake assembly according to claim 5, wherein
the support flange includes a recess that supports the biasing spring.

7. The bicycle rim brake assembly according to claim wherein
the fixing member further comprises a fixing nut portion; and
the biasing member disposed on the fixing nut portion of the fixing member.

8. The bicycle rim brake assembly according to claim 7, wherein
the biasing member comprises a flange portion, a support flange that is disposed between the flange portion and the fixing nut portion, and a biasing spring that is disposed between the flange portion and the fixing nut portion.

9. The bicycle rim brake assembly according to claim 8, wherein
the support flange includes a recess that supports the biasing spring.

10. A bicycle rim brake assembly comprising:
a support bracket having an elongated adjusting aperture,
a fixing member including a screw shaft portion extending through the elongated adjusting aperture,
a first brake arm pivotally supported to the support bracket;
a second brake arm pivotally supported to the support bracket;
an adjustable support member directly contacting both the fixing member and the support bracket, the adjustable support member being rotatably arranged relative to both the fixing member and the support bracket with rotational movement of the adjustable support member moving the support bracket relative to the fixing member.

11. The bicycle rim brake assembly according to claim 10, wherein
the screw shaft portion includes a through hole having a center axis that extends perpendicular to a center longitudinal axis of the screw shaft portion, and
the adjustable support member includes a shaft that extends through the through hole.

12. The bicycle rim brake assembly according to claim 11, wherein:
the through hole comprises a screw hole, and
the shaft comprises a screw shaft that adjustably and movably engages the screw hole.

13. The bicycle rim brake assembly according to claim 11, wherein
at least one end of the shaft comprises an enlarged end that contacts a portion of the support bracket.

14. The bicycle rim brake assembly according to claim 13, wherein
the through hole comprises a screw hole,
the shaft comprises a screw shaft that adjustably and movably engages the screw hole, and
the enlarged end of the shaft comprises a rotation too that engages a portion of the support bracket.

15. A bicycle rim brake assembly comprising:
a support bracket having an elongated adjusting aperture,
a fixing member including a screw shaft portion extending through the elongated adjusting aperture, the screw shaft portion including a through hole;
a first brake arm pivotally supported to the support bracket;
a second brake arm pivotally supported to the support bracket;
an adjustable support member movably engaged to the fixing member, and dimensioned for contact with the support bracket, the adjustable support member including a shaft that adjustably and movably connects with the adjusting through hole of the screw shaft portion of the fixing member.

16. The bicycle rim brake assembly according to claim 15, wherein
the through hole comprises a screw hole, and
the shaft comprises a screw shaft that adjustably and movably engages the screw hole.

17. The bicycle rim brake assembly according to claim 15, wherein
at least one end of the shaft comprises an enlarged end that contacts a portion of the support bracket.

18. The bicycle rim brake assembly according to claim 17, wherein
the through hole comprises a screw hole,
the shaft comprises a screw shaft that adjustably and movably engages the screw hole, and
the enlarged end of the shaft comprises a rotation tool that engages a portion of the support bracket.

* * * * *